(12) United States Patent
Wolff

(10) Patent No.: US 6,247,047 B1
(45) Date of Patent: Jun. 12, 2001

(54) METHOD AND APPARATUS FOR FACILITATING COMPUTER NETWORK TRANSACTIONS

(75) Inventor: Eric L. Wolff, San Diego, CA (US)

(73) Assignee: Control Commerce, LLC, New York, NY (US)

( * ) Notice: Subject to any disclaimer, the term of this patent is extended or adjusted under 35 U.S.C. 154(b) by 0 days.

(21) Appl. No.: 08/972,604

(22) Filed: Nov. 18, 1997

(51) Int. Cl.⁷ .................................................. G06F 17/60

(52) U.S. Cl. .............................. 709/219; 705/14; 705/26

(58) Field of Search ................................... 709/200, 224, 709/218, 216, 223, 229, 219, 217; 707/104, 102, 10; 380/24; 705/26, 27, 14

(56) References Cited

U.S. PATENT DOCUMENTS

| | | | |
|---|---|---|---|
| 5,572,643 | * 11/1996 | Judson | 709/218 |
| 5,675,507 | 10/1997 | Bobo, II | 364/514 R |
| 5,715,453 | 2/1998 | Stewart . | |
| 5,724,424 | * 3/1998 | Gifford | 380/24 |
| 5,778,368 | * 7/1998 | Hogan et al. | 707/10 |
| 5,796,952 | * 8/1998 | Davis et al. | 709/224 |
| 5,948,061 | * 9/1999 | Merriman et al. | 709/219 |
| 5,960,411 | * 9/1999 | Hartman et al. | 705/26 |

FOREIGN PATENT DOCUMENTS

WO97/26729   7/1997   (WO) .

OTHER PUBLICATIONS http://www.Realtor.com, copyright 1995–1999.*
Linda Himelstein et al., "Web Ads Start To Click", Oct. 6, 1997, *Business Week*, pp. 128–140.
Printed excerpts of Viaweb web page [http://www.viaweb.com/]—Home Page, How It Works, Features, and Pricing; printed Nov. 14, 1997.
Printed excerpts of Pandesic web page [http://www.pandesic.com/]—Our E–business Solution: What It Does, Why We Developed It, What It Is; printed Nov. 14, 1997.
Printed excerpts of Open Market's Transact web page [http://www.openmarket.com/transact/]—Software Products Transact: Transact Data Sheet (re Architecture and Capabilities), Transact Media Fact Sheet; printed Nov. 14, 1997.

(List continued on next page.)

Primary Examiner—Dung C. Dinh
(74) Attorney, Agent, or Firm—Brown, Martin, Haller & McClain (57) ABSTRACT

A method and apparatus for facilitating computer network transactions are disclosed herein. The computer network connects a host node and at least one user node. The host node has access to a database including records having predetermined contents, each record associated with a unique identification indicia. Each user node includes a display for displaying an icon and an input device for selecting the icon. The icon is typically an advertising banner having graphics related to an advertised product or service. The icon has embedded therein the network address of the host node, and the indicia for a record associated with the advertised product or service. The icon displayed on one user node is selected by actuating the respective input device (e.g., a mouse). The host network address embedded in the selected icon is used to contact the host node. Then, the record associated with the selected icon is retrieved by searching the database using the indicia embedded in the selected icon as a pointer. An input form is dynamically generated which includes at least one input field requesting data from the user, a portion of the input form depending on the contents of the retrieved record. The input form is presented on the display of the one user node. After entry, at least a minimum set of the requested data is communicated to the host node over the network. The requested data may be validated, with the user requested to provide any needed corrections. Once the data is valid, a confirmation form is generated based on the requested data and is displayed to the user. If the user acknowledges the confirmation form, an acknowledgment form is generated and displayed. The acknowledgment form may include a second cascaded icon.

33 Claims, 6 Drawing Sheets

OTHER PUBLICATIONS

Printed excerpts of DoubleClick Direct web page [http://www.doubleclick.net/nf/direct/direcset.htm]—Direct Overview, Direct Advertiser Benefits, Direct Site Benefits; printed Nov. 14, 1997.

Printed excerpts of The Internet Mall's OrderEasy web page [http://www.internetmall.com/oe/]—Get Started, How OrderEasy Works, Tech Features; printed Nov. 14, 1997.

"'VirtualTAG' Technology from First Virtual Holdings Used in Online Ad for AT&T WorldNet Services,"

*Messagemedia: Press Release*, Jun. 10, 1997, http://www.messagemedia.com/company/press/97_second/release97_06_10.html, Retrieved from Internet: Feb. 5, 1999, see page 1, line 1—page 2, line 2.

Gibbel, S., "Web ad networks give marketers a new option," *Business Marketing*, Sep. 1996, Crain Communications, USA, vol. 81, No. 7, page M4.

* cited by examiner

METHOD AND APPARATUS FOR FACILITATING COMPUTER NETWORK TRANSACTIONS

FIELD OF THE INVENTION

The present invention generally relates to the field of computer networks, and specifically relates to a method and apparatus for facilitating transactions in a computer network environment.

BACKGROUND OF THE INVENTION

The "Internet" is a world-wide network of interconnected computers which employs the client-server model. The Internet includes a large number of interconnected server computers (i.e., "servers"), which are accessed by user computers (i.e., "clients"). A server typically operates a "site" on the Internet which includes a collection of documents or "pages" stored as files, and the network address of a server is specified by its Uniform Resource Language ("URL"). A client is typically the user of a personal computer who accesses the servers through an Internet access provider (providing basic access) or service provider (providing additional on-line services). By running a software program called a "browser", the user can connect with or"link" to a particular server based upon the URL address of that server.

The Internet computer network was originally designed as a communications link to facilitate the exchange of scientific information between governmental laboratories and educational institutions. However, in recent years, the increased use of the "World Wide Web" ("WWW") has fueled explosive growth of the Internet that has extended beyond the scientific community and, indeed, into homes, businesses and classrooms. The WWW refers to a collection of Internet servers utilizing the Hypertext Transfer Protocol ("HTTP") as an applications protocol to provide users with access to files for communicating text, graphics, sound, video, etc. HTTP, in turn, uses a page description language called Hypertext Markup Language ("HTML") to specify the format of WWW pages that are displayed to the users. HTML pages can include hypertext "links" to other servers and files, with the URLs of the target servers stored or embedded within the links.

Links present within a page may appear to a user in a variety of forms. For example, a link may appear as underlined text (e.g., a word or phrase), as bolded text, as text having a different color as surrounding text, or as text having some other form designed to draw the attention of the user such that the link is easily identified as such. When a user selects a link (e.g., by "clicking" on the link with an input device such as a computer mouse), the browser running on the user's computer makes a Transmission Control Protocol/Internet Protocol ("ICP/IP") request to the server identified by the URL specified in the link, and receives a WWW page (i.e., a document formatted according to HTML) from the identified server. A link may also be embedded within a graphical image displayed on the user's computer monitor or display. When the geographical area of the image is selected (e.g., by "clicking" within the area), the browser again makes an TCP/IP request to the server identified by the specified URL. Thus, a user may easily navigate (i.e., "surf") between various servers to find and retrieve HTML pages or documents of interest. The user may navigate using readily available software such as Netscape Navigator 2.0.

As use of the Internet, and particularly its WWW portion, has become more pervasive, merchants have looked to the Internet as providing a new advertising medium for their products and services. A recent review of Internet advertising in general is provided in "Web Ads Start to Click", Business Week, Oct. 6, 1997, at 128–140. Merchants who sponsor their own WWW sites typically include advertising material within their site's pages. However, creating and maintaining a stand-alone WWW site requires a substantial amount of resources, and is beyond the means of many merchants. Also, the time and expense required to set up such a stand-alone site makes this technique unsuitable for certain seasonal, limited time, or one-shot usage. Further, the audience for this advertising material is limited by the extent to which the merchant can attract users to visit its own site.

One technique that has been used to address these problems is the deployment of advertisements on the WWW sites of other sponsors or "content providers" who agree to sponsor the advertisements. The simplest WWW advertisement suitable for deployment takes the form of a static graphical banner. Such a banner includes an image related to the product or service being advertised, typically stored as a graphics file (e.g., a ".gif" file), and displayed according to the HTML description of the sponsoring page. The merchant may pay the sponsor of the particular WWW site an advertising fee for the privilege of deploying its banner on the sponsor's site. The costs for such a banner are relatively low since the merchant need not set up and maintain its own site. Also, the banner can be quickly set up for seasonal or one-time use. Further, the banner may be widely distributed or deployed on many sites, subject to the merchant's payments for use of the advertising real estate. However, such static advertising banners involve only one-way communication, and do not take advantage of the Internet's interactive capabilities which could otherwise be used to solicit data from prospective customers ("users") for generating purchase orders or leads.

Another form of WWW advertisement suitable for deployment which takes advantage of the Internet's interactive capability is an advertising banner including a graphical image displayed according to the HTML description of the sponsoring page and an embedded link to the merchant's site. The embedded link is typically transparent to the user, although it may be displayed if desired. When a user selects the banner (e.g., by "clicking" a mouse on the geographic area of the image), the URL specified by the link takes the user to the merchant's WWW site. The merchant's site can then solicit data from the user for use in generating purchase orders or leads. The user must then, if desired, navigate back to the referring page that was being viewed when the banner was originally selected (the "referring page").

This alternative form of advertising banner can be widely deployed throughout Internet advertising space (subject to the merchant's payment for the advertising real estate). However, such a banner requires the merchant to create and maintain its own WWW site which, as stated above, is expensive and beyond the means of many merchants. Also, such a banner advertisement requires the user to browse or "click" through a number of screens on the merchant's site before being presented with an order form. Research has shown that the need for a user to click through multiple pages strongly decreases the odds that the user will complete the transaction by discouraging "impulse" purchases. Further, since the user is taken to the merchant's site and is not easily returned to the referring page, the retention rate of users on the sponsor's site suffers. Thus, the sponsor is discouraged from displaying the banner, and may demand a higher payment for use of the advertising real estate. The failure to return the user to the referring page also disrupts the user's browsing session, which may adversely affect the user's willingness to use such banners in the future. In addition, such a banner does not provide the merchant with the ability to cross-sell products or services, and the merchant must pay for advertising space for each deployed banner. It would be desirable to provide a method and apparatus for facilitating transactions on a computer network, such as the generation of purchase orders or leads, that do not have these disadvantages.

BRIEF SUMMARY OF THE INVENTION

It is an advantage of the present invention to provide an improved method and apparatus for facilitating transactions on a computer network. Such transactions may include generating either purchase orders or leads.

It is another advantage of the present invention to provide such a method and apparatus wherein selection of an icon such as an advertising banner on a user node causes a host node to generate an input form associated with the icon which is displayed directly on the user node.

It is another advantage of the present invention that the input form is dynamically generated based upon specific product information previously provided by a merchant and stored in a database on the host node.

It is another advantage of the present invention to provide such a method and apparatus wherein the communication with the host node is transparent to the user, thereby facilitating impulsive actions by the user.

It is still another advantage of the present invention to provide a banner advertising transaction enabling system on a computer network such as the Internet for use even by merchants with little or no presence on the computer network. Thus, it is an advantage that the banner advertising transaction enabling system of the invention is inexpensive compared with conventional banner advertising systems.

Another advantage of the present invention is to provide a banner advertising transaction enabling system which automatically sends messages to merchants in response to the selection of the merchant's banner by a user, either by e-mail or facsimile. The message may be a simple notification or a complete purchase order.

Yet another advantage of the present invention is to provide a banner advertising transaction enabling system wherein the user is returned to the page that was being viewed when the banner was originally selected. One advantage of returning the user to the original or referring page is that the sponsor of this page will increase the retention of users at its site. Another advantage of returning the user to this page is to decrease disruption to the user's browsing due to selection of the banner.

Still another advantage of the present invention is to provide a banner advertising transaction enabling system wherein additional banners can be cascaded from a first banner deployed on a page displayed on the display of a user node. One advantage of cascading banners is the ability to cross-sell products or services associated with the additional banners to users who selected the first banner. Another advantage of cascading banners is the ability for advertisers to deploy additional banners without the need to purchase advertising space or real-estate for the additional banners. In addition to cascaded banners, other icons can be cascaded which represent coupons or other promotional material.

One embodiment of the present invention relates to a method for facilitating transactions on a computer network. The network has a plurality of interconnected nodes including a host node and at least one user node. The host node is located on the network at a host network address and each user node is located at a user network address different than the host network address. The host node has access to a database including records having predetermined contents, each record having a unique identification indicia associated therewith. Each user node includes a display for displaying an icon and a user-actuatable input device for selecting the icon. The icon has embedded therein the host network address and the unique identification indicia of one associated record in the database. The method includes contacting the host node based upon the host network address embedded in the icon displayed on the display of one user node in response to selection of the icon by actuation of the respective input device by a user, retrieving the record associated with the selected icon by searching the database accessible to the host node using the indicia embedded in the selected icon as a pointer, and dynamically generating an input form including at least one input field requesting data from the user. At least a portion of the input form depends upon the contents of the retrieved record. The method also includes presenting the input form on the display of the one user node, and after the requested data has been entered, communicating at least a minimum set of the requested data from the one user node to the host node over the network.

Another embodiment of the present invention relates to such a method of facilitating transactions on a computer network which further includes the step of displaying a second icon on the display of the one user node after the first transaction is completed. The second icon has embedded therein the host network address and the unique identification indicia of a second associated record in the database. The process steps are then repeated.

Another embodiment of the present invention relates to an apparatus for facilitating transactions on a computer network having a plurality of user nodes. Each user node includes a display for displaying an icon and a user-actuatable input device for selecting the icon. Each icon has embedded therein a host network address and a unique identification indicia. The apparatus includes a host server located on the computer network at the host network address such that the host server is contacted by the network when the icon displayed on the display of one user node is selected in response to actuation of the respective input device by a user. The host server includes a memory circuit for storing a database including a plurality of records having predetermined contents, each record having a unique identification indicia associated therewith. The indicia of one of the records matches the indicia embedded in the icon displayed on the display of the one user node. The host server further includes a processing circuit which receives the indicia embedded in the icon displayed on the display of the one user node when that icon is selected, searches the database using the received indicia as a pointer, retrieves the record pointed to by the pointer, and dynamically generates an input form including at least one input field requesting data from the user. At least a portion of the input form depends upon the contents of the retrieved record. The processing circuit also transmits the input form to the one user node to be displayed and, after the requested data has been entered by the user, receives at least a minimum set of the requested data from the one user node over the network.

In yet another embodiment of the present invention, a system for facilitating transactions on the Internet includes a host computer connected to the Internet at a predetermined URL. The host computer has access to a product/service information database including a plurality of records, each record storing information for a product or service and having a unique banner identifier associated therewith. The system also includes a plurality of customer computers connected to the Internet at URLs different from the URL of the host computer. Each customer computer includes a display for displaying a banner associated with one of the records, the banner having embedded therein the URL of the host computer and the unique banner identifier of the associated record in the product/service information database. Each customer computer further includes an input device for selecting the banner. The system also includes means for contacting the host computer based upon its predetermined URL embedded in the banner displayed on the display of one customer computer in response to selection of the banner by actuation of the respective input device by a customer, means for searching the product/service information database accessible to the host computer using the unique banner identifier embedded in the selected advertising banner as a pointer, means for retrieving the record pointed to by the pointer, and means for presenting an input form on the display. At least a portion of the input form is dynamically generated based upon the contents of the retrieved record, and the input form includes at least one field requesting data from the customer. The system also includes means for communicating at least a minimum set of the requested data to the host computer, after such data is entered.

Another embodiment of the present invention relates to a method of performing a transaction on a computer network. The network has a plurality of interconnected nodes including a host node and at least one user node. The host node is located at a host network address and each user node is located at a different user network address. The host node has access to a database including records having predetermined contents, each record having a unique identification indicia associated therewith. Each user node includes a display for displaying an icon and a user-actuatable input device for selecting the icon. The icon has embedded therein the host network address and the unique identification indicia of one associated record in the database. The method includes a first step of selecting the icon displayed on the display of one user node by actuating the respective input device. The selection causes the host node addressed by the host network address embedded in the icon to be contacted and to respond by retrieving the record associated with the selected icon by searching the database using the unique identification indicia embedded in the selected icon as a pointer, by generating an input form including at least one input field requesting data from the user, at least a portion of the input form depending upon the contents of the retrieved record, and by presenting the input form on the display. The method includes a second step of entering the requested data into the input form to cause at least a minimum set of the requested data to be communicated from the one user node to the host node.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and in which.

DETAILED DESCRIPTION OF A PREFERRED EMBODIMENT

Figure 1:
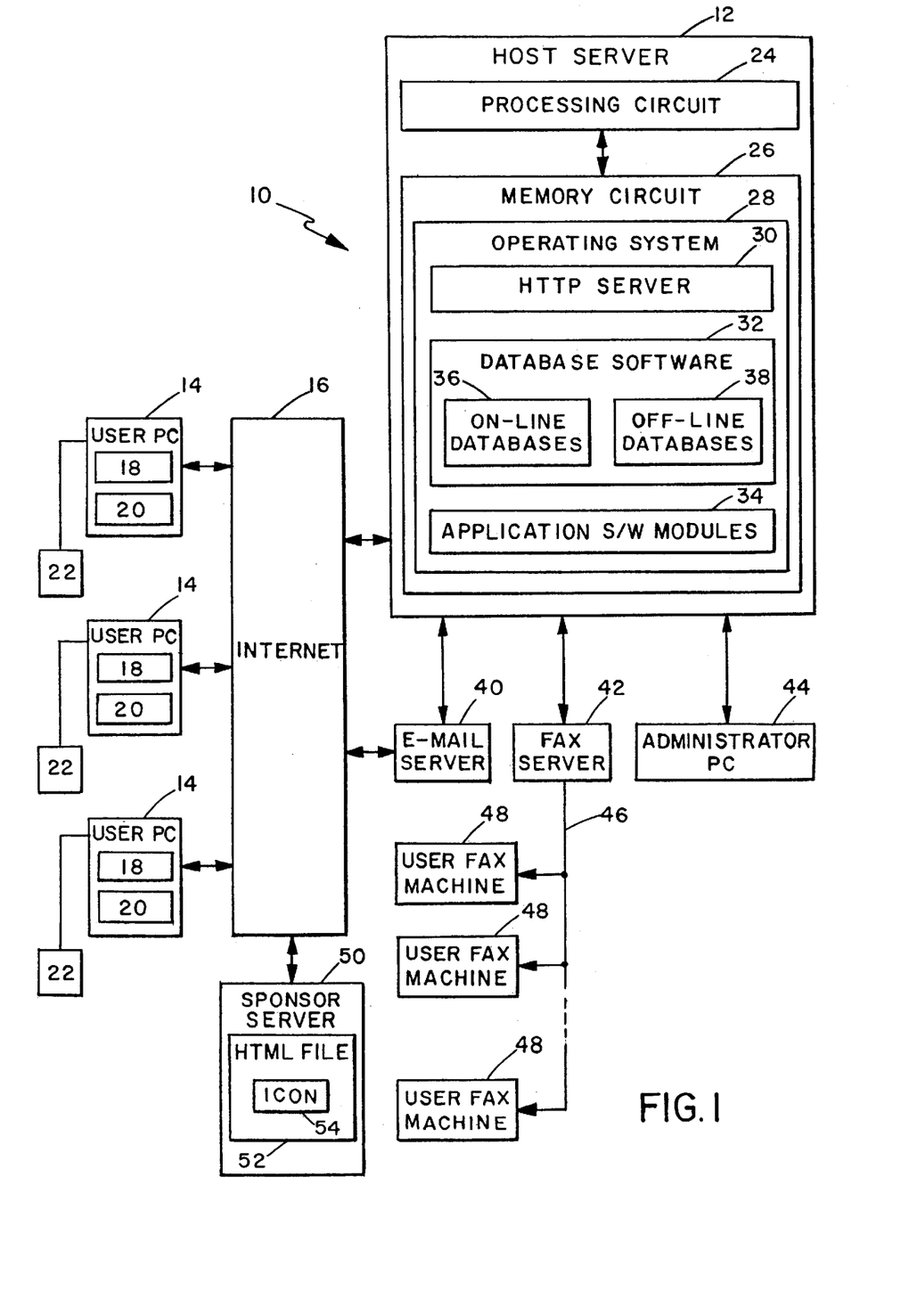
FIG. 1 is a system block diagram showing the hardware and software components, including a host node and a plurality of user nodes, of a preferred embodiment of the present invention.

Referring to FIG. 1, hardware and software components of an improved banner system 10 for facilitating transactions are shown. System 10 includes a host node or server computer 12 ("host server") and a plurality of user nodes or personal computers (PCs) 14 ("user nodes") coupled to a computer network such as the Internet 16. Host server 12 is located on Internet 16 at a host network address specified by a predetermined Uniform Resource Language ("URL"). User nodes 14 are located on Internet 16 at user network addresses specified by predetermined URLs different from the URL of host server 12. User nodes 14 may also be dynamically addressed.

Each user node 14 includes a monitor or display 18 for displaying text and graphics, and one or more input devices such as a keyboard 20 or a mouse 22. Each user node 14 may also have other input devices such as a voice recognition circuit (not shown). User nodes 14 communicate over Internet 16 through a plurality of user servers (not shown) run by an Internet access provider (e.g., Internet America) or service provider (e.g., America On-Line), with one or more user nodes 14 connected to each user server. User node 14 may also include a television set connected to Internet 16 by a suitable interface such as a set-top box (e.g., Web-TV available from Philips Magnavox, Sony, or Web-TV Networks, Inc.), and the input device may include a remote control device compatible with the Internet interface.

Host server 12 includes a processing circuit 24 coupled to a memory circuit 26. Processing circuit 24 executes software programs stored in memory circuit 26 to control the operation of host server 12. The programs include an operating system 28 for directing the processing of lower-level programs. These programs include an Hypertext Transfer Protocol ("HTTP") server 30, a database program 32, and application-specific software modules 34. Database program 32 manages on-line and off-line relational databases 36 and 38. The databases, as described below, include a product or service information database including records for storing data specific to a plurality of advertising banners or icons, and a transaction database including records for storing data specific to individual transactions. Sensitive information (e.g., credit card data) may be stored in off-line relational database 38 to provide additional security by limiting access from Internet 16. In one embodiment, operating system 28 is the UNIX operating system, database program 32 is the Informix Universal Server ("IUS") database software, databases 36 and 38 are Informix relational databases, and host server 12 includes an Ultra 450 server computer available from Sun Microsystems, Inc. of California.

Host server 12 is also coupled to an electronic mail ("e-mail") server 40, a facsimile ("FAX") server 42, and an administrator PC 44. E-mail server 40 is a server computer which manages the communication of e-mail messages over Internet 16 according to instructions provided by host server 12. Thus, e-mail server 40 off-loads the transmission of e-mail messages (described below) to user nodes 14. Similarly, FAX server 42 is a server computer which manages the communication of FAXes over a telephone network 46 according to instructions provided by host server 12. Thus, FAX server 42 off-loads transmission of FAX messages (described below) to a plurality of user FAX machines 48. Administrator PC 44 is used to perform system administration functions for host server 12.

Internet 16 includes many other interconnected computers, one of which is a sponsor server 50 which operates a WWW site for a sponsor who has agreed to post a merchant's advertising banner, possibly in exchange for payment of an advertising fee. Sponsor server 50 stores a collection of files including an HTML file 52 specifying the format of a WWW page which includes an icon 54 for display on display 18 of an accessing user node 14. Icon 54 includes a graphical image, typically stored in a graphics file (e.g., a ".gif" file), and an embedded link containing the URL of host server 12 and a unique identification indicia. The embedded link is typically transparent to the user, but may be displayed if desired. The graphics file may include, for example, data for an advertisement banner for a particular product or service. The indicia uniquely identifies the particular product or service being advertised, and is assigned to the merchant when a product or service record is created in database 36 by the process described below. The merchant typically provides the specifications for icon 54, including its graphics file and unique identification indicia, to the sponsor of server 50.

Sponsor server 50 can be any network server or computer which sponsors a page displaying icon 54. Thus, sponsor server 50 may be operated by a person or entity who has agreed to post the merchant's icon 54 on a page, for free or in exchange for payment of advertising fees. Alternatively, sponsor server 50 may be the merchant's own web page located either on the merchant's own web site or on another person or entity's web site. For example, the merchant may be an individual who has the right to post his own web page on the server of his Internet access or service provider, with the merchant's web page including icon 54. In addition, a single icon 54 may be posted on any number of sponsor servers or computers. Thus, for example, a merchant could post a single advertising banner or icon in one or in many pages throughout Internet 16 space.

In other embodiments, the invention can employ other means of presenting a WWW page including icon 54 on the display of user node 14. For example, the HTML description of the page may be replaced by XML (i.e., "eXtensible Markup Language"), the JAVA programming language, SGML ("Standard for Markup Languages", including HTML as one version), or any other means of describing or presenting a WWW page.

In operation, each user node 14 may access sponsor server 50 by specifying its URL. The WWW page specified by HTML file 52, including icon 54, is displayed on display 18 of the accessing user node 14. Selection of icon 54 by the user through an actuation of an input device such as keyboard 20, mouse 22 or a voice recognition circuit, causes Internet 16 to contact host server 12 based on its URL embedded within icon 54. Host server 12 also receives the unique identification indicia embedded within icon 54, and uses it to retrieve a product/service record containing data specific to the product or service being advertised. Icon 54 can be deployed on as many pages stored in as many servers such as server 50 as desired by the merchant, subject to the payment of any required advertising fees.

Figure 2:
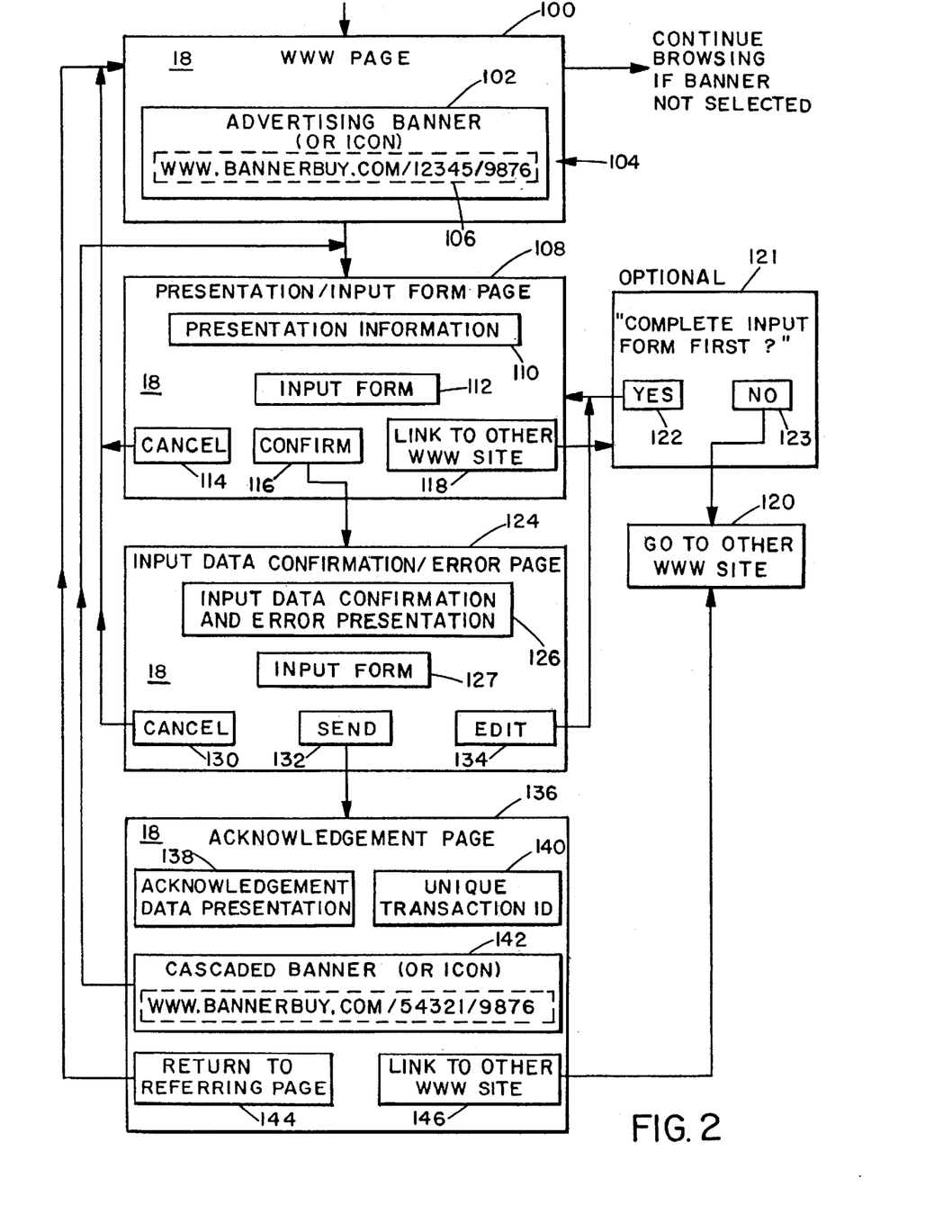
FIG. 2 is a flow diagram showing the pages displayed on the display of a user node shown in FIG. 1, and the relationship between these pages, during a transaction facilitated by the present invention.
Figure 3:
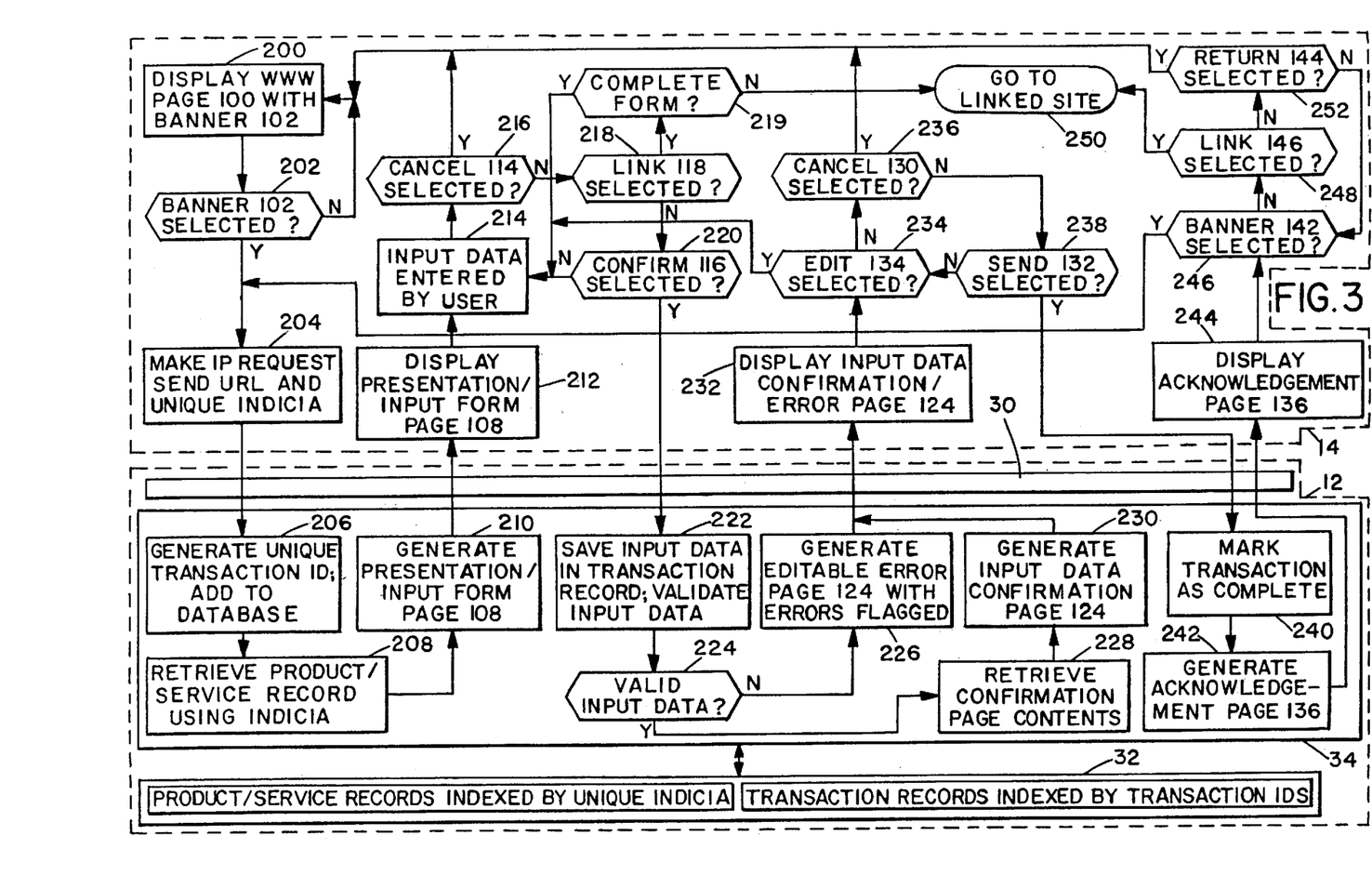
FIG. 3 is a flow diagram showing the steps performed by the user node in FIG. 2 and the host node of FIG. 1, and the interaction between these steps, during a transaction facilitated by the present invention.

Referring to both FIGS. 2 and 3, a transaction facilitated by the present invention is described. FIG. 2 shows the WWW pages sequentially displayed on display 18 of user node 14 during a transaction. FIG. 3 shows the steps performed by user node 14 during the transaction and the corresponding steps performed by host server 12. The steps performed by user node 14 are shown in a dashed box labeled with reference numeral 14, and the corresponding steps performed by host server 12 are shown in a dashed box labeled 12. The box labeled 30 in FIG. 3 shows that all Internet messages to and from host server 12 are handled by HTTP server 30. The box labeled 34 shows the steps performed by application software modules 34. The box labeled 32 shows that application software modules 34 access a product/service information database and a transaction database through database software 32. To aid the reader in distinguishing between FIGS. 2 and 3 in the discussion below, reference numerals associated with the WWW pages in FIG. 2 start at 100, while reference numerals associated with the steps in FIG. 3 start at 200. Although FIGS. 2 and 3 describe a single transaction, any number of transactions may occur at or near the same time.

At step 200, a WWW page 100 is displayed on display 18 of a user node 14. Page 100 is retrieved from sponsor server 50 (FIG. 1) when server 50 is accessed by specifying its URL during a browsing session by the user. Page 100 is specified by HTML file 52 which, as described above, caused an icon or advertising banner 102 to be displayed. Banner 102, displayed on a geographic area 104 of page 100, includes graphics relating to a particular product or service being advertised. Embedded within banner 102 is the URL of host server 12 (e.g., "www.bannerbuy.com") and a unique indicia (e.g., "12345") identifying the product or service being advertised. The indicia is appended to the end of the URL (e.g., "www.bannerbuy.com/12345"), and the URL is linked to banner 102. The URL and indicia are shown in a dashed box 106 to indicate they are transparent to the user. In other embodiments, the URL and indicia can be displayed to the user, or banner 102 can be replaced by another icon having embedded therein the same URL and indicia. For example, banner 102 can be replaced by a hyperlink including the URL of host server 12 and the indicia of the advertised product or service.

At step 202, a user uninterested in the advertised product or service may continue browsing without selecting banner 102. However, if the user wants to make a transaction or wants more information about the advertised product or service, the user selects banner 102 using an input device such as mouse 22 by clicking in geographic area 104. In response, at step 204, user node 14 makes an TCP/IP request using the URL ("www.bannerbuy.com") embedded within banner 102 to contact host server 12 over Internet 16.

At step 206, host server 12 generates a unique transaction identification number ("transaction ID"), and creates a new record in the transaction record database which can be indexed by the transaction ID. This record will be used to store any input data entered by the user for this transaction. At step 208, host server 12 receives the unique indicia (e.g., "12345") embedded within banner 102 and uses the indicia to search the on-line product/service database for a record containing information specific to the advertised product or service. This record was previously defined by the merchant, at which time its unique identification indicia was assigned. After finding and retrieving the record, at step 210, host server 12 dynamically generates a presentation/input form page 108 based at least in part on data stored within the retrieved record, and sends page 108 over Internet 16 for display on display 18 of user node 14 at step 212. Page 108 is displayed by opening a new browser or new window on user node 14.

Presentation/input form page 108 includes a presentation area 110, an input form area 112, a cancel icon 114, a confirm icon 116, and a link icon 118. As will become apparent from the description below, areas of page 108 related to the advertised product or service (e.g., presentation area 110; input form area 112) depend on the contents of the retrieved record. Other areas of page 108 (e.g., cancel icon 114; confirm icon 116) do not. The term "dynamically generated" refers to the ability of host server 12 to read the contents of the retrieved record and, based on those contents, to generate a display page that depends at least in part on the retrieved record.

Presentation area 110 presents information to the user relating to the advertised product or service. For example, area 110 may present text or graphics describing the product or service, available user options (e.g., color, size, model), and the merchant's solicitation for the product or service including pricing information, shipping and delivery charges, and tax charges.

Input form area 112 requests input data from the user which is used by host server 12 to generate a virtual purchase order or lead. For example, area 112 includes input fields for requesting user contact data (e.g., name, mailing address, e-mail address, telephone number, FAX number, etc.), user order information (e.g., product selection data such as color, size, model, quantity, etc.), user shipping information (e.g., UPS, FEDEX, etc.), and user payment method (e.g., credit card, electronic commerce, invoice, information-only). The requested data is entered by the user at step 214.

At step 216, selection of cancel icon 114 allows the user to cancel the transaction and return to referring page 100 displayed at step 200. At step 218, selection of optional link icon 118 allows the user to link to a specified WWW site at step 250, if the merchant selected this option when creating the product/service record that was retrieved. However, if the retrieved record specifies that the input fields in area 112 should first be completed, host server 12 generates an optional "complete input form first?" page 121, and sends page 121 over Internet 16 for display on user node 16 at step 219. Selection of a "YES" icon 122 returns the user to page 108 and step 214 to complete the data input form. Selection of a "NO" icon 123 links the user to the WWW site specified by the merchant. (Note that FIG. 3 does not show the specific steps associated with generating and processing page 121 since these steps are optional.) At step 220, selection of confirm icon 116 allows the user to confirm that the requested data has been entered, and that the user wishes to continue the transaction.

In response to selection of confirm icon 116, at step 222, host server 12 saves the input data entered by the user in the transaction record indexed by the transaction ID, and validates the input data by applying a set of rules to the input data and flagging an error if the rules are violated. Host server 12 will flag an error if the user failed to complete a minimum set of input fields necessary to complete the order. For example, host server 12 may flag an error if a required quantity term was not entered, if a required product selection criteria such as size or color was not entered, or if the user failed to enter user contact or payment information. Host server 12 may also flag an error if the entered data does not follow a known, predefined format. For example, host server 12 may flag a credit card number as being invalid if the wrong number of digits were entered.

At steps 224–230, host server 12 generates an input data confirmation/error page 124, and sends page 124 over Internet 16 for display on user node 14 at step 232. At step 224, host server 12 checks whether the input data was valid. If the data was invalid, host server 12 generates an editable error form at step 226 which flags the errors. If the data was valid, host server 12 retrieves the contents of a confirmation page from the retrieved product/service record, and generates an input data confirmation form. At step 232, user node 14 displays the editable error form if the data was invalid, and displays the confirmation form otherwise.

Page 124 has an input data confirmation/error presentation area 126, a cancel icon 130, a send icon 132, and an edit icon 134. Presentation area 126 flags any identified errors for correction by the user using the error form if the data was found to be invalid, or echoes the data entered by the user and completes pricing calculations (e.g., determining the total payment due), when applicable (i.e., for purchases but not leads), if the data was valid.

At step 234, selection of edit icon 134 allows the user to edit the previously-entered data by returning to step 214 if an error was flagged or if the user wishes to make a change. At step 236, selection of cancel icon 130 allows the user to cancel the transaction and return to referring page 100 displayed at step 200. At step 238, selection of send icon 132 allows the user to confirm that the validated data displayed in area 126 is correct and that the user wishes to complete the transaction. Send icon 132 applies both to purchase order and lead transactions.

In response to selection of send icon 132, host server 12 marks the transaction as complete at step 240. At this point, the completed purchase order or lead information has been stored in the transaction record indexed by the transaction ID (see step 222). At step 242, host server 12 generates an acknowledgment page 136 and sends page 136 over Internet 16 for display on user node 14 at step 244. Page 136 has an acknowledgment presentation area 138, a unique transaction ID area 140, an optional cascaded advertising banner 142, a return icon 144, and a link icon 146.

Acknowledgment presentation area 138 acknowledges the completion of the transaction with an appropriate message (e.g., "Thank you"). Unique transaction ID area 140 displays the number of the transaction record previously generated.

Cascaded advertising banner 142 is a second banner similar to banner 102, except that the graphics relate to a second advertised product or service, and the unique identification indicia of that second product or service is appended to the URL of host server 12. At step 246, selection of cascaded banner 142 causes the above-described process to repeat by jumping back to the TCP/IP request at step 204 using the URL and the unique indicia of the cascaded product or service. Thus, a banner for a second product or service can optionally be cascaded or nested with the first banner depending upon the contents of the retrieved record. Similar nesting may be performed with third, fourth, or any number of additional cascaded banners. In one embodiment, data entered by the user in a preceding transaction is used by host server 12 to automatically fill in corresponding input fields for a cascaded transaction, further helping the user to complete the transaction.

In alternative embodiments, cascaded banner 142 may be another form of icon which represents a coupon or other promotional material. Clicking on this cascaded icon will cause, for example, a coupon to be generated by host server 12 and sent to display 18 of user node 14.

At step 248, selection of optional link icon 146 links the user to the specified site at step 250 which was defined by the merchant as part of the retrieved record. At step 252, selection of return icon 144 allows the user to return to referring page 100 displayed at step 200. At this point, the user has been returned to exactly the same page that was being viewed when the transaction was started. The user may then continue the browsing session with only the minimal interruptions of viewing pages 108, 124 and 136. Since the user has only viewed the pages related to the transaction, and has not had to click through a large number of screens, the transaction is more likely to be completed (i.e., impulse buys are not discouraged).

At this point, the transaction is complete from the user's point of view. However, referring to FIG. 4, host server 12 now uses the data entered by the user (and stored in the transaction database) to generate a virtual purchase order ("VPO") or lead, and to notify the appropriate merchant that the VPO or lead is available. Host server 12 reaches step 300 after generating acknowledgment page 136 at step 242. At step 300, host server 12 finds the merchant data associated with the transaction. This data is also stored in the product/service record that was the subject of the transaction. At step 302, host server 12 retrieves the merchant contact data stored in this record. This data, previously defined by the merchant, may include the merchant's name, mailing address, e-mail address, telephone number, FAX number, and preferred message delivery method (i.e., e-mail, FAX).

Figure 4:
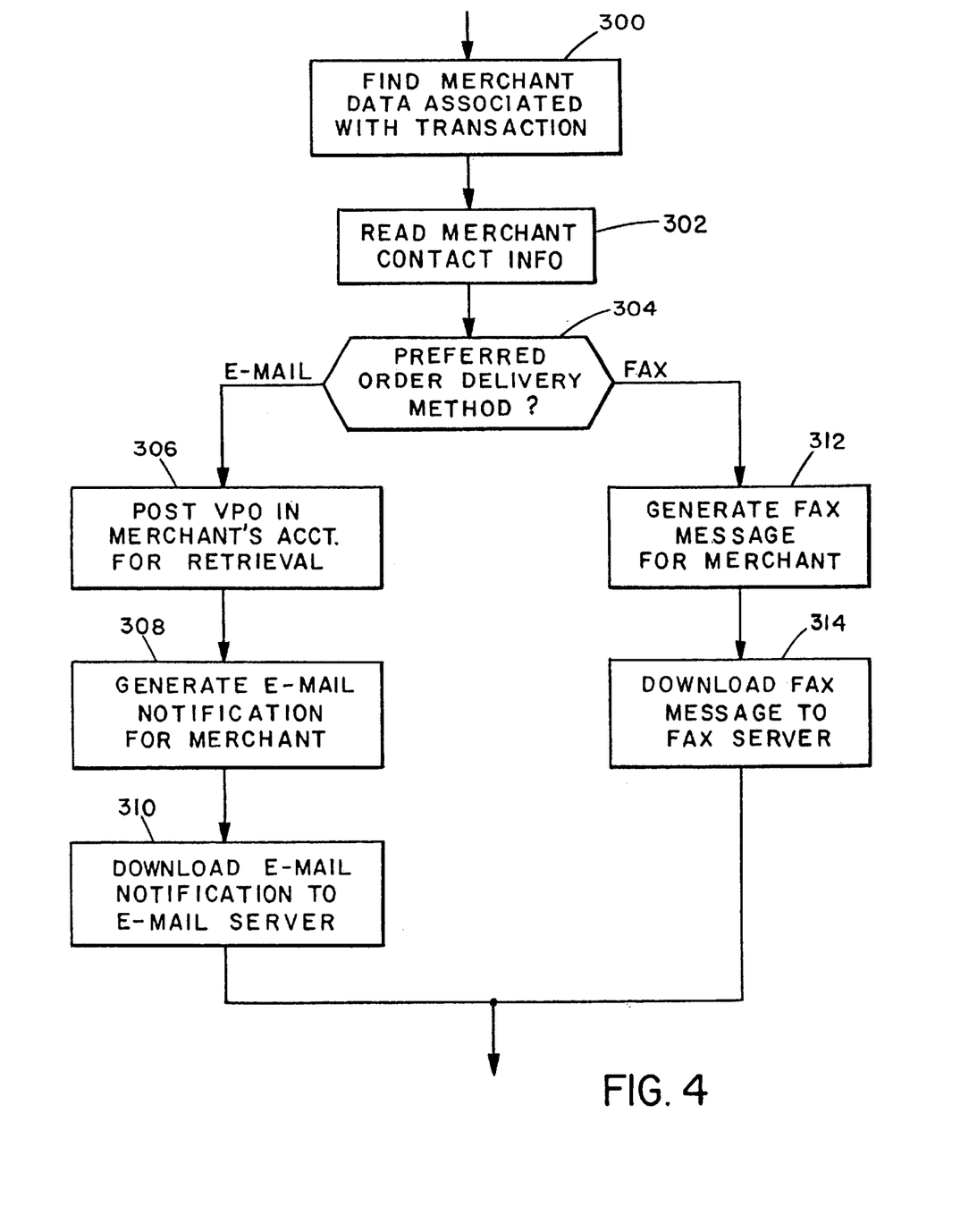
FIG. 4 is a flow diagram showing additional steps performed by the host server to generate a virtual purchase order ("VPO") or lead based upon the data entered by the user during the transaction described in FIGS. 2 and 3, and to notify the appropriate merchant that the VPO or lead is available.

At step 304, host server 12 determines whether the merchant's preferred message delivery method is e-mail or FAX. If the merchant wishes to receive messages via e-mail, at step 306, host server 12 generates a VPO using the user-entered data stored in the transaction record, and posts the VPO in an area of server 12 accessible to the merchant. At step 308, host server 12 generates an e-mail notification message including the merchant's e-mail address. The message includes contact information for the user but, for security reasons, does not include confidential information such as the user's credit card number. At step 310, host server 12 downloads the message to e-mail server 40 (FIG. 1) for transmission to the merchant's computer (one of user nodes 14). E-mail server 40 may send the e-mail immediately, or may batch the e-mails received during a specified time period (e.g., send e-mails to a merchant once per day). Upon receiving the e-mail, the merchant logs into host server 12 to access and down-load the VPO. Thus, e-mail server 40 off-loads the task of sending e-mail from host server 12.

In another embodiment, the e-mail message may include the purchase order itself, including confidential information. This embodiment may provide encryption software to encrypt the e-mail message to address any security concerns. In this embodiment, there is no need for the merchant to log into host server 12 to access and download the purchase order.

If the merchant wishes to receive messages via FAX, at step 312, host server 12 generates a FAX message for the merchant including the user-entered data and the merchant's FAX number. At step 314, host server 12 downloads the FAX message to FAX server 42 (FIG. 1) for transmission to a merchant FAX machine 48 (FIG. 1). Since the FAX message includes the purchase order, even a merchant without Internet access can use system 10 to generate sales and leads, once a product/service record is created.

Thus, system 10 facilitates transactions between the user and the merchant by generating purchase orders or leads (analogous to the order forms in a catalog filled in by prospective customers to order products). The merchant may then accept or reject the purchase orders, may provide lead information to prospective customers, or may contact the user to gather additional information (e.g., to request a different payment method if the credit card number originally provided by the user is invalid). Thus, system 10 acts as a clearing-house for facilitating Internet transactions which is compatible with any payment system as specified by the merchant.

The above-described method for facilitating a transaction can be varied as will be readily apparent to a person of skill in the art. For example, the validation of the input data in step 222 could be eliminated, and page 124 could simply display a confirmation of the entered data without flagging errors. Further, the presentation of an acknowledgment or "thank-you" page to the user could be eliminated completely, and selection of send icon 132 could return the user directly to the referring page 100 at step 200.

Figure 5:
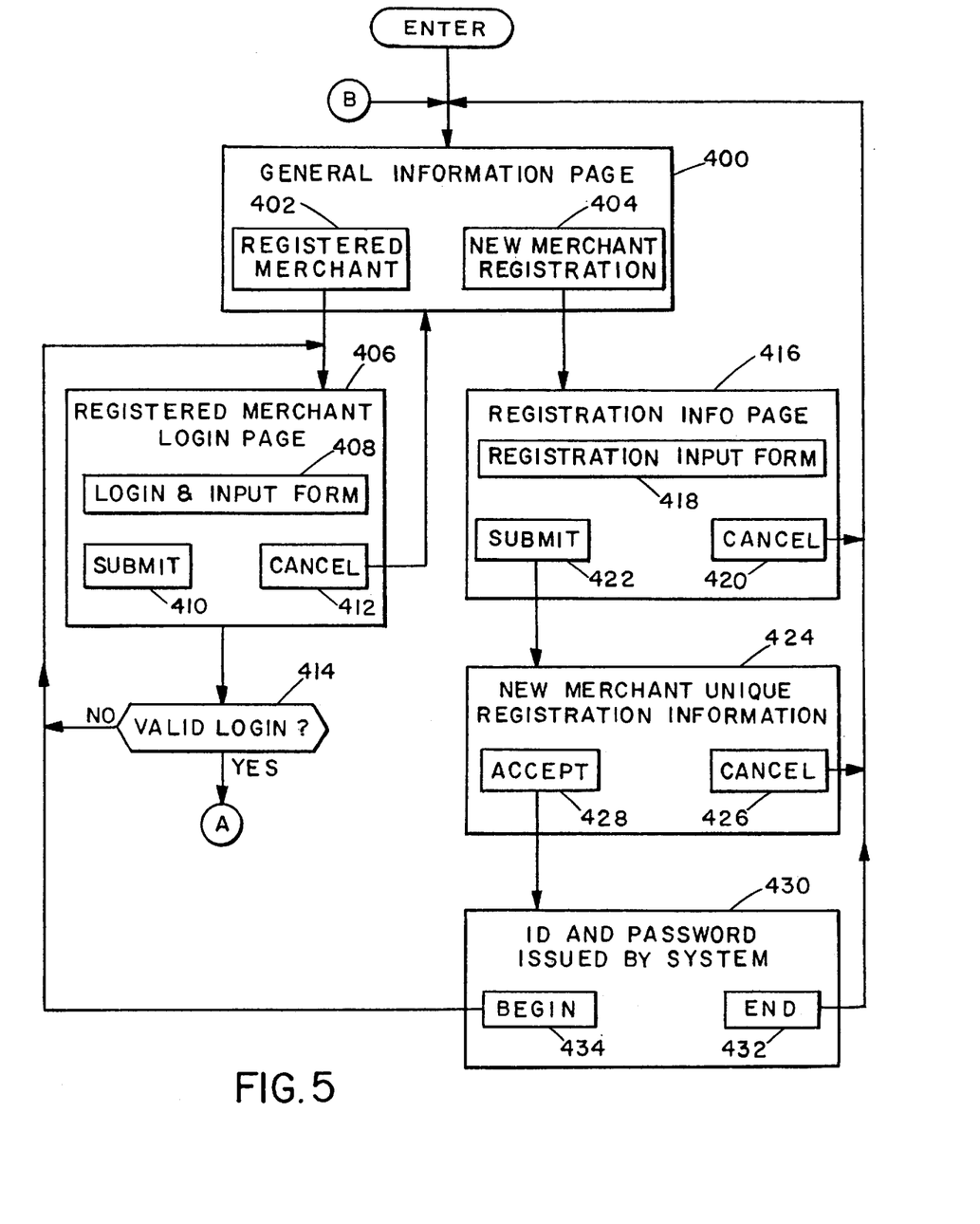
FIG. 5 is a flow diagram showing the pages displayed on the display of a user node shown in FIG. 1 when a new merchant registers with the host node of FIG. 1, or a registered merchant logs into the system, and the relationship between these pages.
Figure 6:
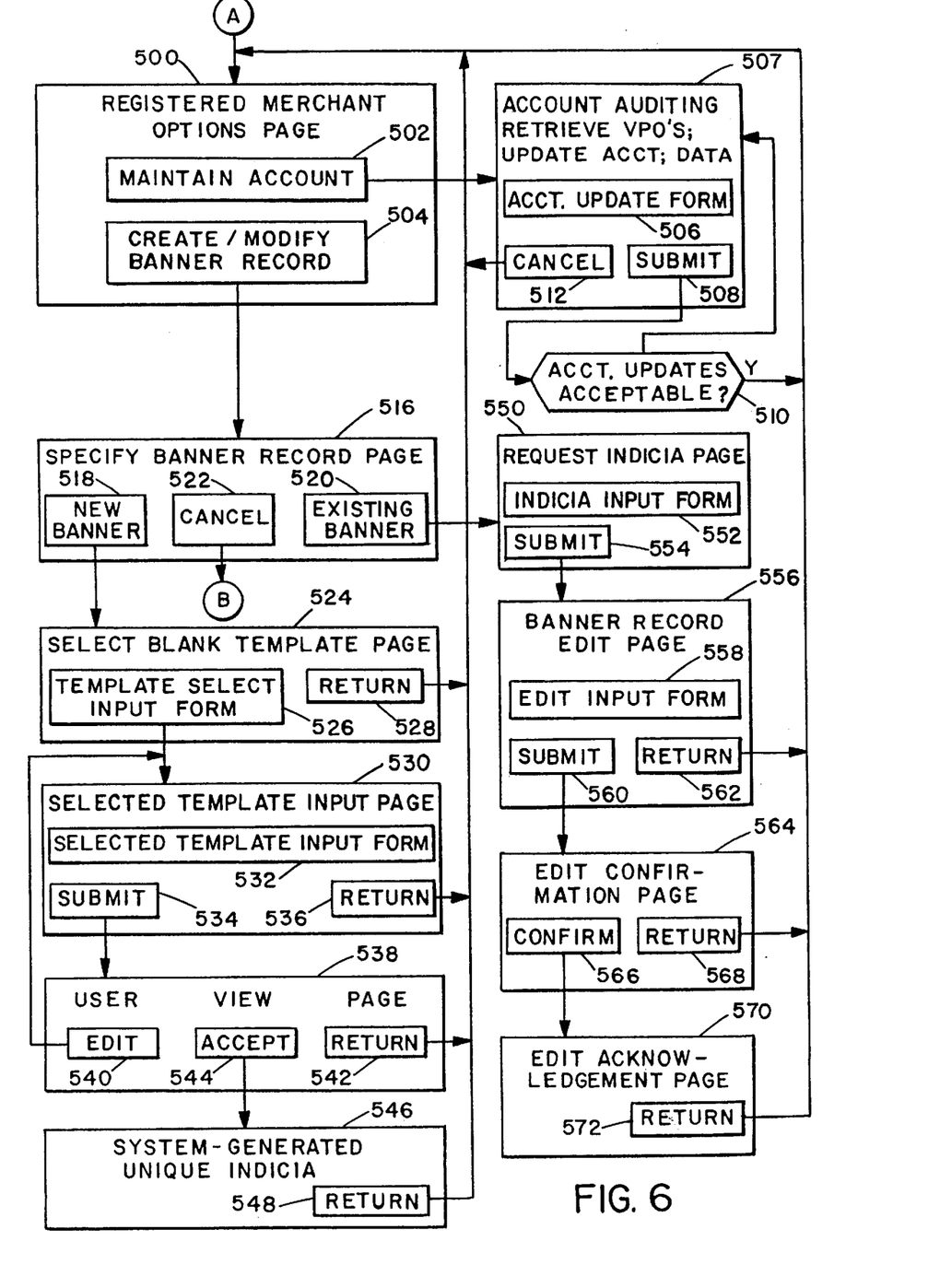
FIG. 6 is a flow diagram showing the pages displayed on the display of a user node shown in FIG. 1, and the relationship between these pages, when a registered merchant user creates or modifies a record in a product/service information database, or performs account maintenance.

FIGS. 5–6 show the pages seen by a merchant, and the relationships between the pages, when a merchant performs a merchant-specific function such as registration, account maintenance, or creating or modifying banners. As in FIGS. 2 and 3, the pages are generated by host server 12, and are then sent to a user node 14 for display. A "merchant", in the context of FIGS. 5–7, is a person or entity using, or that wants to use, an icon or banner such as banner 102 to advertise a product or service. This same "merchant" may also become a "user", in the context of FIGS. 2–4, by selecting such an icon.

Referring to FIG. 5, a merchant wishing to perform a merchant-specific function uses a user node 14 to access host server 12 by specifying its URL. In response, a general information page 400 specified by an HTML file stored in host server 12 is displayed on display 18 of the user node 14. Page 400 presents general system information, and requests that the merchant select a "registered merchant" icon 402 or a "new merchant" icon 404. A registered merchant is a merchant who has previously registered with host server 12 to create an account, while an unregistered merchant has not. If icon 402 is selected, a registered-merchant login page 406 is displayed. Page 406 presents information of interest to registered merchants, and requests that the merchant complete a login and password input form 408. After completing form 408, the merchant selects a submit icon 410. Selecting cancel icon 412 allows the merchant to return to general information page 400. The merchant is successfully logged in if host server 12 validates the login and password at step 414. The login and password are valid if the merchant previously registered, and if the system administrator has not declared the login and password to be invalid. If the login or password is invalid, the merchant is returned to login page 406. After successfully logging in, a registered merchant may perform registered-merchant functions such as account maintenance and the creation or modification of the criteria associated with the banners (i.e., the contents of the product/service records stored in the database), as described below.

New merchant icon 404 is selected if the merchant is not yet registered. Selection of icon 404 causes a registration information page 416 to be displayed. Page 416 presents registration information such as information describing the merchant fee structure for using system 10, and requests the merchant to complete a registration input form 418. Form 418 requests information such as the merchant's name, mailing address, e-mail address, telephone number, FAX number, and merchant billing information. Selecting a cancel icon 420 allows the merchant to return to page 400. After completing form 418, the merchant selects a submit icon 422, which submits the registration information to host server 12. Then, host server 12 generates a new merchant unique registration information page 424, and sends page 424 to user node 14 for display. Page 424 displays, for example, contractual information between the merchant and the system operator. Selecting a cancel icon 426 allows the merchant to cancel the registration and return to page 400. If the terms are acceptable, the merchant selects an accept icon 428. In response, host server 12 creates a new account, generates a unique merchant ID and password, and displays this data to the merchant in an ID and password page 430. The merchant may then select an end icon 432 to end the registration procedure and return to page 400, or may select a begin icon 434 to branch to registered-merchant login page 406. The newly-registered merchant may then create a product or service information record as described below.

Referring to FIG. 6, the WWW pages seen by a logged-in registered merchant when maintaining its account, or when creating or modifying a record associated with a banner, are shown. After login, host server 12 causes a registered-merchant options page 500 to be displayed on user node 14. Selection of a maintain account icon 502 allows the merchant to perform a variety of account maintenance functions represented generally by an account maintenance page 504. Account maintenance functions include auditing the merchant's account to track activity pertaining to the merchant's banners. For example, the merchant can examine the number of click-throughs for each banner indicia. The merchant may also retrieve VPOs posted to its account after each transaction involving its banners. Thus, a merchant who has received an e-mail notification as described above accesses and downloads the VPOs by logging into host server 12. Further, the merchant may update its account data (e.g., change of address) by entering data in an account update form 506 and selecting a submit icon 508. At step 510, host server 12 returns to page 500 if the updates are acceptable. If the updates are invalid, the merchant is requested to re-enter the data on form 506. Selection of a cancel icon 512 allows the merchant to exit account maintenance. Account maintenance functions are described only generally herein, and the specific functions would be well known to people of skill in the art.

Selection of a create/modify banner record icon 514 on page 500 causes host server 12 to generate a specify banner record page 516, and to send page 516 to user node 14 for display. Page 516 includes a new banner record icon 518 for creating a new database record associated with a banner through a unique indicia, an existing banner record icon 520 for modifying an existing banner record, and a cancel icon 522 for returning to general information page 400.

Selection of new banner record icon 518 causes host server 12 to generate a select blank template page 524 for selecting a transaction template, and to send page 524 to user node 14 for display. The transaction templates are geared toward different types of transactions. For example, one template may be geared toward purchase order transactions while a second template may be geared toward lead transactions. Some fields may be the same in each template (e.g., fields requesting user contact data) while other fields may differ (e.g., a purchase order template requests payment method data while a lead template does not). The merchant enters the selected template into a template select input form 526. Selection of a return icon 528 causes a return to option page 500.

After the template is selected, host server 12 generates a selected template input page 530, and sends page 530 to user node 14 for display. Page 530 includes an input form 532 requesting the merchant to complete and configure fields within the selected template. Configuration refers to the ability of the merchant to turn particular fields on and off. The fields specify the format of the WWW pages that will be seen by the user when a banner is selected. For example, the fields will require the merchant to enter information about the product or service to be advertised. When finished, the merchant selects a submit icon 534 to submit the data. Selection of a return icon 536 causes a return to option page 500.

After the template data is submitted, host server 12 generates a user view page 538, and sends page 538 to user node 14 for display. Page 538 shows the merchant how the pages that will be presented to the user during a transaction will look. Selection of an edit icon 540 returns the merchant to input page 530 to edit the entered data. Thus, the merchant may continually toggle between pages 530 and 538 to edit the template data and then view the effects of the changes. Selection of a return icon 542 causes a return to option page 500. Selection of an accept icon 544 indicates that the merchant is satisfied with the entered template data.

After the template data is accepted, host server 12 generates a unique identification indicia and a new record within the product/service database which can be indexed by the indicia. Host server 12 then generates a unique identification indicia page 546 for displaying the assigned indicia, and sends page 546 to user node 14 for display. Selection of a return icon 548 causes a return to option page 500.

This process of creating new records is repeated for each new product or service that the merchant wishes to advertise. At this point, host server 12 marks the new product/service record as active, such that the product or service record can be retrieved by the selection of an appropriate icon or banner 102. The merchant can now deploy the advertising icon or banner 102 associated with the record through the unique identification indicia throughout Internet advertising space since the merchant now knows the URL of host server 12 and the unique indicia of the product/service record.

Selection of existing banner icon 520 causes host server 12 to generate a request indicia page 550, and send page 550 to user node 14 for display. Page 550 requests the merchant to input the unique identification indicia of the banner record to be edited into input form 552. Selection of a submit icon 554 causes host server 12 to search its product/service information database for the record corresponding to the indicia. Host server 12 then generates a banner record edit page 556 including an edit input form 558 showing the contents of the retrieved record and requesting any desired edits. Page 556 is sent to user node 14 for display. Selection of a submit icon 560 causes the edited data to be submitted, while selection of a return icon 562 causes a return to option page 500.

After submission of the edited data, host server 12 generates an edit confirmation page 564 which echoes the entered data, and communicates page 564 to user node 14 for display. Selection of a confirm icon 566 causes the edited record to be stored back into the product/service database, while selection of a return icon 568 causes a return to option page 500.

After confirmation of the edited data, host server 12 generates an edit acknowledgment page 570, and sends page 570 to user node 14 for display. Page 570 informs the merchant that the change was successful. Selection of a return icon 572 causes a return to page 500.

Thus, a merchant wishing to use system 10 to facilitate transactions over Internet 16 must first register. After registration, the merchant creates one or more records in a product/service database stored in host server 12. Each record includes information specific to the particular product or service to be advertised. The merchant may then deploy icons or banners 102 throughout Internet advertising space which have embedded therein the URL of host server 12 and the unique identification indicia associated with the advertised product or service. When an Internet user selects banner 102, system 10 facilitates the generation of a VPO or lead, as described above.

It will be evident that there are additional embodiments and applications which are not disclosed in the detailed description but which clearly fall within the scope and spirit of the present invention. The specification is, therefore, not intended to be limiting, and the scope of the invention is to be limited only by the following claims.

I claim:

1. A method for facilitating transactions on a computer network, the computer network having a plurality of interconnected nodes including a host node and at least one user node, the host node located on the computer network at a host network address and each user node located at a user network address different than the host network address, the host node having access to a database including a plurality of records having predetermined contents, each record being addressable with address information incorporated into unique identification indicia, each user node including a display for displaying an icon and a user-actuatable input device for selecting the icon, comprising the steps of:

contacting the host node using the host network address in a URL associated with the icon displayed on the display of one user node after selection of the icon by actuation of the respective input device by a user said activation resulting in a TCP/IP request to the host network address;

retrieving the record associated with the selected icon from the database accessible to the host node using at least a portion of the same URL associated with the icon to retrieve one associated record in the database;

dynamically generating an input form including at least one input field requesting data from the user, wherein at least a portion of the input form depends upon the contents of the retrieved record;

presenting the input form on the display of the one user node in a separate transaction session while maintaining the hosting (icon) window;

after the requested data has been entered, communicating at least a minimum set of the requested data from the one user node to the host node over the network and;

recording an order on the host system based on the requested data.

2. The method of claim 1, wherein the icon is included within a page displayed on the display of the one user node.

3. The method of claim 2, wherein the page is an HTML page.

4. The method of claim 2, wherein the icon includes a banner displayed within a portion of the page.

5. The method of claim 4, wherein the input device is a computer mouse, and the banner is selected by clicking the computer mouse on the banner.

6. The method of claim 1, wherein the computer network is the Internet, and the host network address includes the Uniform Resource Language (URL) of the host node.

7. The method of claim 1, wherein the input form is presented on the display of the one user node by opening a new window.

8. The method of claim 7, wherein the input form is presented by opening a browser.

9. The method of claim 2, wherein the one user node returns to the display of the referring page when the transaction is complete.

10. The method of claim 1, further comprising the step of validating the requested data entered by the user and, if the requested data is invalid, generating an error form and presenting the error form on the display of the one user node.

11. The method of claim 10, wherein the error form includes at least one field requesting corrected data from the user, further comprising the step of communicating at least the corrected data from the user node to the host node over the network after the requested corrected data is entered.

12. The method of claim 1, further comprising the step of generating a confirmation form and presenting the confirmation form on the display of the one user node after the requested data is communicated to the host node, the confirmation form including at least one confirmation field based upon the requested data.

13. The method of claim 12, wherein the confirmation form includes at least one acknowledgment field requesting acknowledgment from the user, whereby the user can acknowledge that the confirmation form is correct.

14. The method of claim 13, further comprising the step of generating an acknowledgment form and presenting the acknowledgment form on the display of the one user node in response to receiving acknowledgment.

15. The method of claim 14, wherein the acknowledgment form includes a second icon having embedded therein the host network address and a second unique identification indicia of a second associated record in the database, whereby selection of the second icon by actuation of the respective input device by the user causes transactions to be cascaded.

16. The method of claim 1, wherein the database includes contact data for contacting an entity associated with the retrieved record, the method further comprising the step of transmitting a message to the entity based upon the contact data after the host node receives the requested data.

17. The method of claim 16, wherein the message includes an electronic mail message sent to the entity.

18. The method of claim 16, wherein the message includes a facsimile message sent to the entity.

19. A method for facilitating transactions on a computer network, the computer network having a plurality of interconnected nodes including a host node and at least one user node, the host node located on the computer network at a host network address and each user node located at a user network address different than the host network address, the host node having access to a database including a plurality of records having predetermined contents, each record having a unique identification indicia associated therewith, each user node including a display for displaying an icon and a user-actuatable input device for selecting the icon, the icon having embedded therein the host network address and the unique identification indicia of one associated record in the database, comprising the steps of:

contacting the host node based upon the host network address embedded in the icon displayed on the display of one user node in response to selection of the icon by actuation of the respective input device by a user;

retrieving the record associated with the selected icon by searching the database accessible to the host node using the unique identification indicia embedded in the selected icon as a pointer;

generating an input form including at least one input field requesting data from the user, wherein at least a portion of the input form depends upon the contents of the retrieved record;

presenting the input form on the display of the one user node; and after the requested data has been entered, communicating at least a minimum set of the requested data from the one user node to the host node over the network.

20. A method for facilitating cascaded transactions on a computer network, the computer network having a plurality of interconnected nodes including a host node and at least one user node, the host node located on the computer network at a host network address and each user node located at a user network address different than the host network address, the host node having access to a database including a plurality of records having predetermined contents, each record having a unique identification indicia associated therewith, each user node including a display for displaying an icon and a user-actuatable input device for selecting the icon, the icon having embedded therein the host network address and the unique identification indicia of one associated record in the database, comprising the steps of:

(a) contacting the host node based upon the host network address embedded in the icon displayed on the display of one user node in response to selection of the icon by actuation of the respective input device by a user;

(b) retrieving the record associated with the selected icon by searching the database accessible to the host node using the unique identification indicia embedded in the selected icon as a pointer;

(c) dynamically generating an input form including at least one input field requesting data from the user, wherein at least a portion of the input form depends upon the contents of the retrieved record;

(d) presenting the input form on the display of the one user node;

(e) after the requested data has been entered, communicating at least a minimum set of the requested data from the one user node to the host node over the network; and (f) in response to occurrence of step (e), displaying a second icon on the display of the one user node, the second icon having embedded therein the host network address and the unique identification indicia of a second associated record in the database, and repeating steps (a) through (e).

21. An apparatus for facilitating transactions on a computer network, the computer network having a plurality of user nodes located at a plurality of user network addresses, each user node including a display for displaying an icon and a user-actuatable input device for selecting the icon, each icon having embedded therein a host network address and a unique identification indicia, comprising:

a host server located on the computer network at the host network address such that the host server is contacted by the computer network when the icon displayed on the display of one user node is selected in response to actuation of the respective input device by a user;

the host server including a memory circuit configured to store a database including a plurality of records having predetermined contents, each record having a unique identification indicia associated therewith, wherein the unique identification indicia of one of the records matches the indicia embedded in the icon displayed on the display of the one user node;

the host server further including a processing circuit configured to receive the unique identification indicia embedded in the icon displayed on the display of the one user node when that icon is selected, to search the database using the received unique identification indicia as a pointer, to retrieve the record pointed to by the pointer, to dynamically generate an input form including at least one input field requesting data from the user, at least a portion of the input form depending upon the contents of the retrieved record, to transmit the input form to the one user node to be displayed and, after the requested data has been entered by the user, to receive at least a minimum set of the requested data from the one user node over the network.

22. The apparatus of claim 21, wherein the computer network is the Internet, and the host network address includes the URL of the host server.

23. The apparatus of claim 21, wherein the input form is transmitted to the one user node such that the input form is displayed in a new window.

24. A method of performing a transaction on a computer network, the computer network having a plurality of interconnected nodes including a host node and at least one user node, the host node located on the computer network at a host network address and each user node located at a user network address different than the host network address, the host node having access to a database including a plurality of records having predetermined contents, each record having a unique identification indicia associated therewith, each user node including a display for displaying an icon and a user-actuatable input device for selecting the icon, the icon having embedded therein the host network address and the unique identification indicia of one associated record in the database, comprising the steps of:

selecting the icon displayed on the display of one user node by actuating the respective input device, the selection of the icon causing the host node addressed by the host network address embedded in the icon to be contacted and to respond by retrieving the record associated with the selected icon by searching the database accessible to the host node using the unique identification indicia embedded in the selected icon as a pointer, by generating an input form including at least one input field requesting data from the user, at least a portion of the input form depending upon the contents of the retrieved record, and by presenting the input form on the display of the one user node; and entering the requested data into the input form, causing at least a minimum set of the requested data to be communicated from the one user node to the host node over the network.

25. The apparatus of claim 23, wherein the input form is transmitted such that the input form is displayed by opening a browser.

26. The apparatus of claim 21, wherein the processing circuit is further configured to validate the requested data entered by the user and, if the requested data is invalid, to generate an error form and to transmit the error form to the one user node to be displayed.

27. The apparatus of claim 26, wherein the error form includes at least one field requesting corrected data from the user, the processing circuit further configured to receive, after the requested corrected data is entered by the user, at least the corrected requested data from the one user node.

28. The apparatus of claim 21, wherein the processing circuit is further configured to generate a confirmation form after the requested data is received from the one user node, the confirmation form including at least one confirmation field based upon the requested data, and to transmit the confirmation form to the one user node to be displayed.

29. The apparatus of claim 28, wherein the confirmation form includes at least one acknowledgment field requesting acknowledgment from the user, whereby the user can acknowledge that the confirmation form is correct, and the processing circuit is further configured to generate an acknowledgment form in response to receiving acknowledgment from the one user node, and to transmit the acknowledgment form to the one user node to be displayed.

30. The apparatus of claim 29, wherein the acknowledgment form includes a second icon having embedded therein the host network address and a second unique identification indicia of a second associated record in the database, whereby the second icon is cascaded with the first icon.

31. The apparatus of claim 21, wherein the database includes contact data for contacting an entity associated with the retrieved record, and the processing circuit is further configured to transmit a message to the entity based on the contact data after the host server receives the requested data.

32. The apparatus of claim 31, wherein the message is one of the group selected from an electronic mail message and a facsimile message.

33. A system for facilitating transactions on the Internet, comprising:

a host computer connected to the Internet at a predetermined URL and having access to a product/service information database including a plurality of records, each record storing information for a product or service and having a unique banner identifier associated therewith;

a plurality of customer computers connected to the Internet at URLs different from the URL of the host computer, each customer computer including a display for displaying a banner associated with one of the records, the banner having embedded therein the URL of the host computer and the unique banner identifier of the associated record in the product/service information database, each customer computer further including an input device for selecting the banner;

means for contacting the host computer based upon its predetermined URL embedded in the banner displayed on the display of one customer computer in response to selection of the banner by actuation of the respective input device by a customer;

means for searching the product/service information database accessible to the host computer using the unique banner identifier embedded in the selected advertising banner as a pointer;

means for retrieving the record pointed to by the pointer;

means for presenting an input form on the display, at least a portion of the input form dynamically generated based upon the contents of the retrieved record, the input form including at least one field requesting data from the customer; and after the requested data is entered by the customer, means for communicating at least a minimum set of the requested data to the host computer.

\* \* \* \* \*

UNITED STATES PATENT AND TRADEMARK OFFICE
CERTIFICATE OF CORRECTION

PATENT NO.   : 6,247,047 B1
DATED        : June 12, 2001
INVENTOR(S)  : Barrera, III It is certified that error appears in the above-identified patent and that said Letters Patent is hereby corrected as shown below:

Column 1,
Line 41, change "oh" to -- on --.

Column 2,
Line 56, change "ode" to -- one --.

Column 4,
Line 17, change "ant" to -- and --.
Line 26, change "serve" to -- server --.
Line 35, change "transport" to -- Transport --.

Column 6,
Line 38, change "vital" to -- virtual --.

Column 7,
Line 58, change "ate" to -- are --.

Column 9,
Line 23, change "She" to -- The --.

Column 10,
Line 2, change "not" to -- no --.

Column 14,
Line 9, change "With" to -- with --.

Signed and Sealed this

Fifteenth Day of January, 2002

JAMES E. ROGAN
*Director of the United States Patent and Trademark Office*

*Attest:*

*Attesting Officer*

UNITED STATES PATENT AND TRADEMARK OFFICE
CERTIFICATE OF CORRECTION

PATENT NO.    : 6,247,047 B1
DATED         : June 12, 2001
INVENTOR(S)   : Eric L. Wolff It is certified that error appears in the above-identified patent and that said Letters Patent is hereby corrected as shown below:

This certificate supersedes Certificate of Correction issued January 15, 2002, the number was erroneously mentioned and should be deleted since no Certificate of Correction was granted.

Signed and Sealed this

Twenty-second Day of October, 2002

*Attest:*

*Attesting Officer*

JAMES E. ROGAN
*Director of the United States Patent and Trademark Office*